(12) United States Patent
Tsutsumi

(10) Patent No.: US 10,018,241 B2
(45) Date of Patent: Jul. 10, 2018

(54) VIBRATION ISOLATOR

(75) Inventor: Tatsuya Tsutsumi, Yokohama (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 0 days.

(21) Appl. No.: 14/126,703

(22) PCT Filed: Jun. 29, 2012

(86) PCT No.: PCT/JP2012/066742
§ 371 (c)(1),
(2), (4) Date: Dec. 16, 2013

(87) PCT Pub. No.: WO2013/005681
PCT Pub. Date: Jan. 10, 2013

(65) Prior Publication Data
US 2014/0103586 A1  Apr. 17, 2014

(30) Foreign Application Priority Data

Jul. 1, 2011 (JP) .................. 2011-147612

(51) Int. Cl.
*F16F 13/08* (2006.01)
*F16F 13/10* (2006.01)
(52) U.S. Cl.
CPC ............ *F16F 13/08* (2013.01); *F16F 13/106* (2013.01)
(58) Field of Classification Search
CPC ........ F16F 13/08; F16F 13/106; F16F 13/105; F16F 13/10; F16F 13/108; F16F 13/101
(Continued)

(56) References Cited

U.S. PATENT DOCUMENTS 4,621,795 A * 11/1986 Eberhard ............. F16F 13/106
188/378
4,666,137 A * 5/1987 Hamaekers .......... F16F 13/106
137/493
(Continued)

FOREIGN PATENT DOCUMENTS

CN  2849321 Y  12/2006
CN  201090655 Y  7/2008
(Continued)

OTHER PUBLICATIONS

International Search Report of PCT/JP2012/066742 dated Sep. 11, 2012.
(Continued)

*Primary Examiner* — Xuan Lan Nguyen
(74) *Attorney, Agent, or Firm* — Sughrue Mion, PLLC

(57) ABSTRACT

Provided is a vibration isolator (10) including a partition member (15) configured to partition a liquid chamber of a first attachment member (11) into a main liquid chamber (16a) disposed at one side in an axial direction and a subsidiary liquid chamber (16b) disposed at the other side in the axial direction, and a movable plate (18) displaced according to a pressure difference between the main liquid chamber (16a) and the subsidiary liquid chamber (16b), wherein an accommodating chamber (29) configured to accommodate the movable plate (18), a first communication hole (23) configured to bring the accommodating chamber (29) in communication with the main liquid chamber (16a), and a second communication hole (24) configured to bring the accommodating chamber (29) in communication with the subsidiary liquid chamber (16b) are formed in the partition member (15). An opening area in the partition member (15) of the first communication hole (23) is larger
(Continued)

Figure 1:
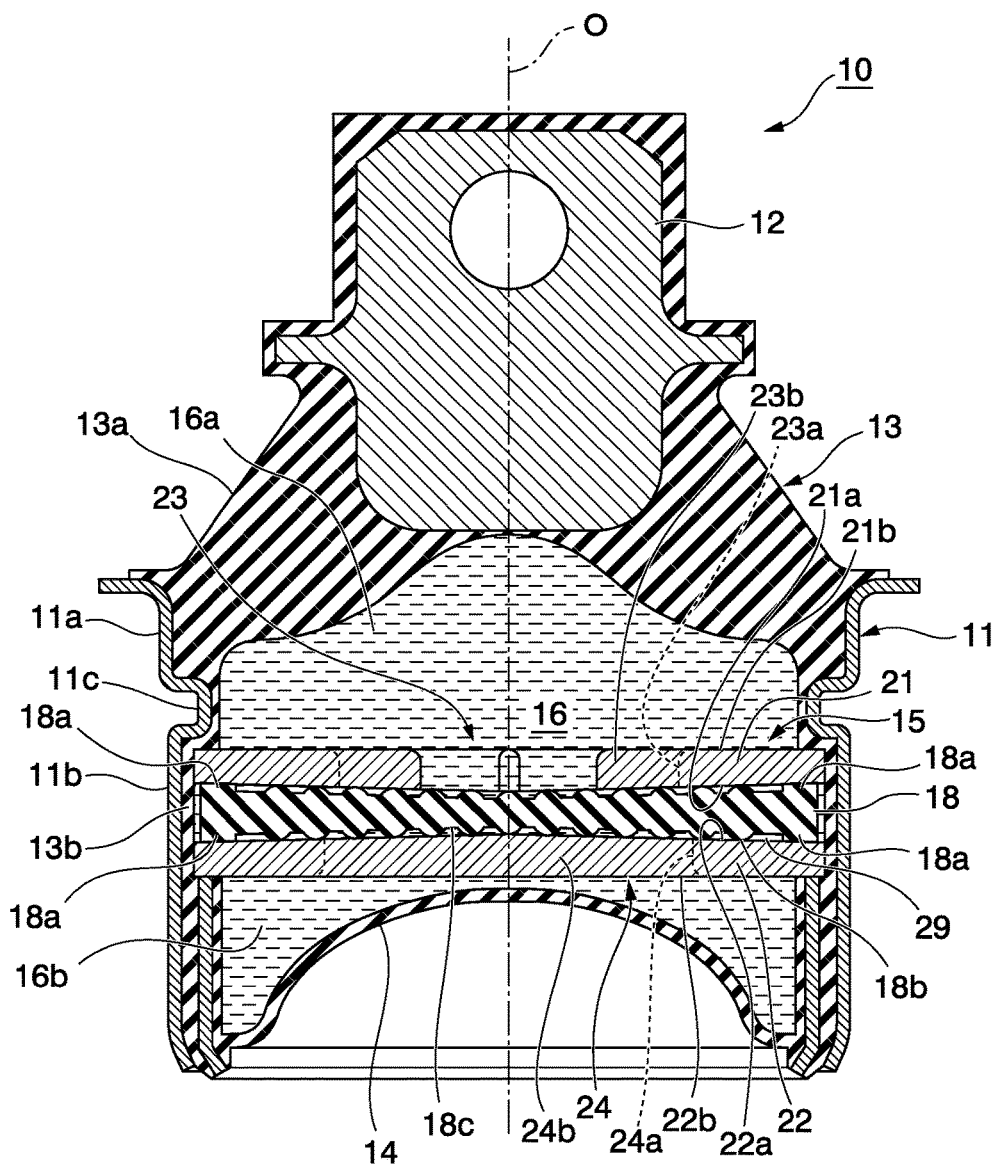

than that in the partition member (15) of the second communication hole (24).

16 Claims, 5 Drawing Sheets

(58) Field of Classification Search
    USPC .................................................. 267/140.13
    See application file for complete search history.

(56) References Cited

U.S. PATENT DOCUMENTS

| | | | | |
|---|---|---|---|---|
| 4,781,362 | A * | 11/1988 | Reuter | F16F 13/106 180/312 |
| 4,815,720 | A * | 3/1989 | Vanessi | F16F 13/106 188/320 |
| 7,258,331 | B2 * | 8/2007 | Schneider | F16F 13/105 267/140.13 |
| 2003/0168789 | A1 | 9/2003 | Kries et al. | |
| 2006/0249891 | A1 * | 11/2006 | Ueki | F16F 13/105 267/140.13 |
| 2008/0290573 | A1 | 11/2008 | Katayama et al. | |

FOREIGN PATENT DOCUMENTS

| | | |
|---|---|---|
| EP | 0 332 902 A2 | 9/1989 |
| EP | 0737825 A1 | 10/1996 |
| JP | 2006-207630 A | 8/2006 |
| JP | 2007-177975 A | 7/2007 |
| JP | 2008-291869 A | 12/2008 |
| JP | 2008-291969 A | 12/2008 |
| JP | 2009-41761 A | 2/2009 |
| JP | 2009041615 A | 2/2009 |
| WO | 2009/028501 A1 | 3/2009 |
| WO | 2010/046191 A1 | 4/2010 |

OTHER PUBLICATIONS

Written Opinion of PCT/JP2012/066742 dated Sep. 11, 2012.
Communication dated Dec. 16, 2014 from the Japanese Patent Office in counterpart application No. 2011-147612.
Communication dated Dec. 1, 2014 from the State Intellectual Property Office of the People's Republic of China in counterpart application No. 201280031554.7.
Communication dated Apr. 17, 2015, issued by the European Patent Office in corresponding European Application No. 12807092.7.
Communication dated Jun. 26, 2015 from the State Intellectual Property Office of the People's Republic of China in counterpart application No. 201280031554.7.

* cited by examiner

VIBRATION ISOLATOR

TECHNICAL FIELD

This present invention relates to a vibration isolator.

This application is a National Stage of International Application No. PCT/JP2012/066742, filed on Jun. 29, 2012, which claims priority from Japanese Patent Application No. 2011-147612, filed on Jan. 7, 2011, the contents of all of which are incorporated herein by reference in their entirety.

BACKGROUND ART

A vibration isolator, which is applied to a vehicle, industrial machinery, or the like, configured to absorb and damp vibrations of a vibration generating unit such as an engine or the like is known. As the above-mentioned conventional vibration isolator, for example, a vibration isolator including a first tubular attachment member connected to one of a vibration generating unit and a vibration receiving unit, a second attachment member connected to the other unit, an elastic body configured to elastically connect the first attachment member and the second attachment member, a partition member disposed inside the first attachment member and configured to partition a liquid chamber formed inside the first attachment member into a main liquid chamber using the elastic body as a portion of a wall surface and disposed at one side in an axial direction and a subsidiary liquid chamber disposed at the other side in the axial direction, and a movable plate displaced in response to a pressure difference between the main liquid chamber and the subsidiary liquid chamber is known (for example, see Patent Document 1).

In the above-mentioned vibration isolator, when a liquid pressure in the main liquid chamber is abruptly decreased, a plurality of bubbles are generated in the liquid in the main liquid chamber (cavitation occurs). After that, when the bubbles disappear due to an increase with liquid pressure in the main liquid chamber, strange noises occur.

As a device for solving the above-mentioned problems, various means have been proposed in the related art.

For example, a device that employs a special liquid such as liquid fluorine or the like as a liquid sealed in a liquid chamber, a device having a valve installed at a partition member and configured to open the valve when a liquid pressure in a main liquid chamber is decreased to a predetermined value or less, or further, a device of increasing the stiffness of a movable plate or an elastic body is known.

CITATION LIST

Patent Document

[Patent Document 1] Japanese Unexamined Patent Application, First Publication No. 2009-41761

SUMMARY OF INVENTION

Technical Problem

However, in the conventional vibration isolator, when the special liquid such as fluorine liquid or the like is selected, manufacturing cost of the vibration isolator becomes high. In addition, when the valve is installed at the partition member, noises occur during opening and closing operations of the valve. Further, when the stiffness of the movable plate or the elastic body is increased, an amount of displacement or deformation of the movable plate or the elastic body according to the pressure difference is also varied. For this reason, a bad influence is exerted on absorption/damping properties (hereinafter referred to as "vibration isolating properties") of the vibrations of the vibration isolator. As a result, desired vibration isolating properties cannot be obtained.

In consideration of the above-mentioned circumstances, the present invention provides a vibration isolator capable of suppressing generation of strange noises due to cavitation collapse while maintaining the manufacturing cost of the vibration isolator or desired vibration isolating properties.

Solution to Problem

According to an aspect of the present invention, a vibration isolator includes a first tubular attachment member connected to one of a vibration generating unit and a vibration receiving unit and a second attachment member connected to the other unit; an elastic body configured to elastically connect the first attachment member and the second attachment member; a partition member disposed inside the first attachment member and configured to partition a liquid chamber formed inside the first attachment member into a main liquid chamber using the elastic body as a portion of a wall surface and disposed at one side in an axial direction and a subsidiary liquid chamber disposed at the other side in the axial direction; and a movable plate displaced according to a pressure difference between the main liquid chamber and the subsidiary liquid chamber. An accommodating chamber configured to accommodate the movable plate, a first communication hole configured to bring the accommodating chamber in communication with the main liquid chamber, and a second communication hole configured to bring the accommodating chamber in communication with the subsidiary liquid chamber are formed in the partition member. The main liquid chamber and the subsidiary liquid chamber are in communication with each other through the accommodating chamber, the first communication hole and the second communication hole. In addition, an opening area in the partition member of the first communication hole is larger than that in the partition member of the second communication hole.

In this case, the opening area of the first communication hole near the main liquid chamber is larger than that of the second communication hole near the subsidiary liquid chamber. Accordingly, the movable plate can be easily displaced or deformed more largely toward the main liquid chamber than toward the subsidiary liquid chamber. Accordingly, when the elastic body is deformed to largely expand the main liquid chamber while maintaining the displacement ability or deformation ability toward the subsidiary liquid chamber of the movable plate, as the movable plate is largely displaced or deformed toward the main liquid chamber, a decrease in liquid pressure in the main liquid chamber can be suppressed to suppress generation of cavitation. In addition, such an effect can be obtained, for example, even when the kind of liquid sealed in the liquid chamber is changed or a valve is not installed. As a result, the above-mentioned generation of strange noises due to cavitation collapse can be prevented while maintaining the manufacturing cost or desired vibration isolating properties.

Advantageous Effects of Invention

According to the present invention, generation of strange noises due to cavitation collapse can be suppressed while maintaining the manufacturing cost or desired vibration isolating properties.

BRIEF DESCRIPTION OF INVENTION

Figure 2:
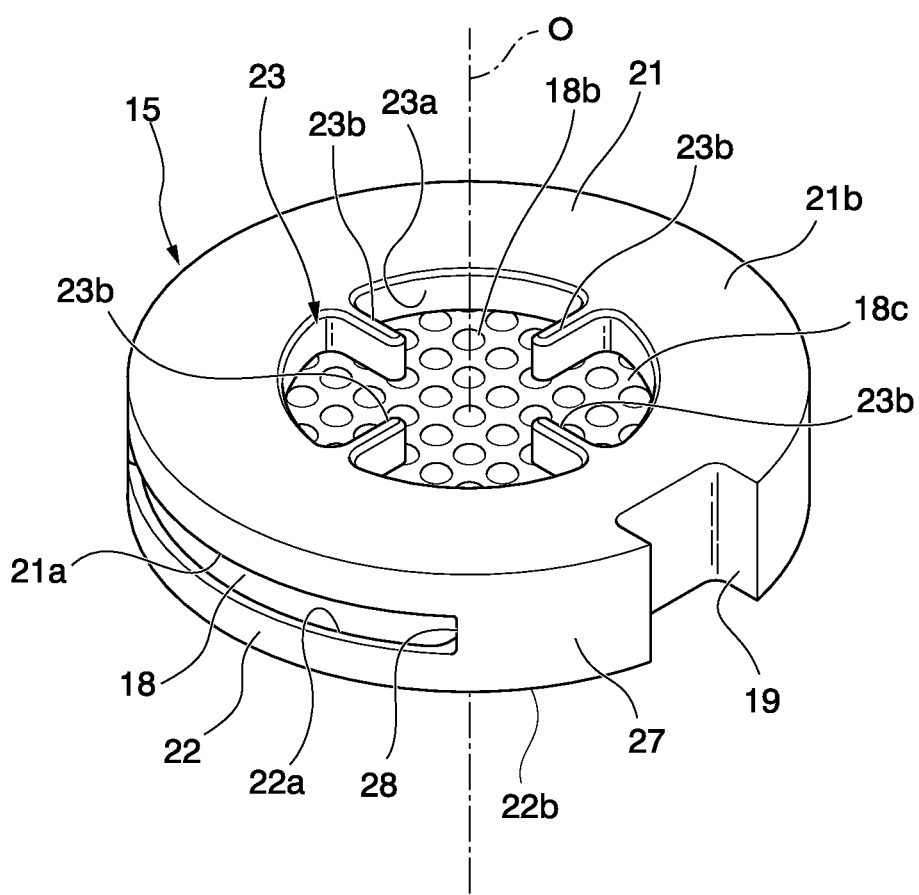
Figure 3:
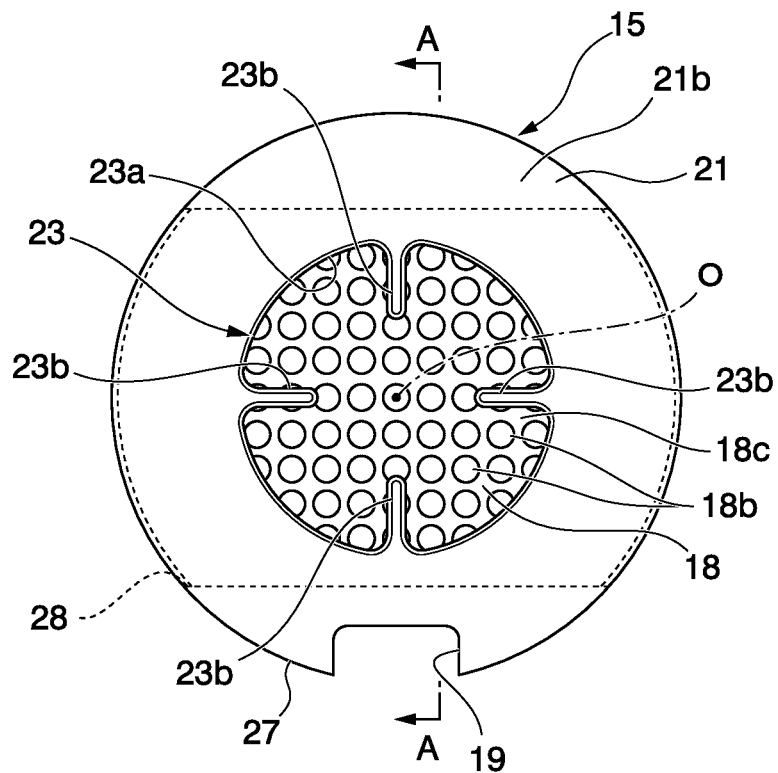
Figure 4:
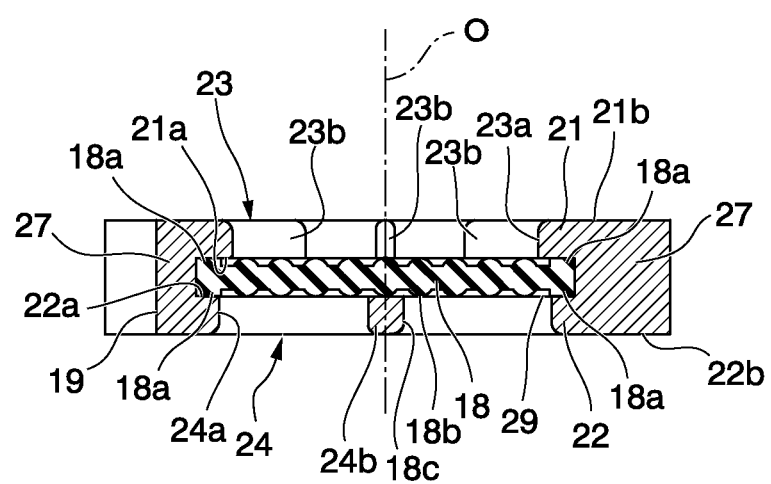
Figure 5:
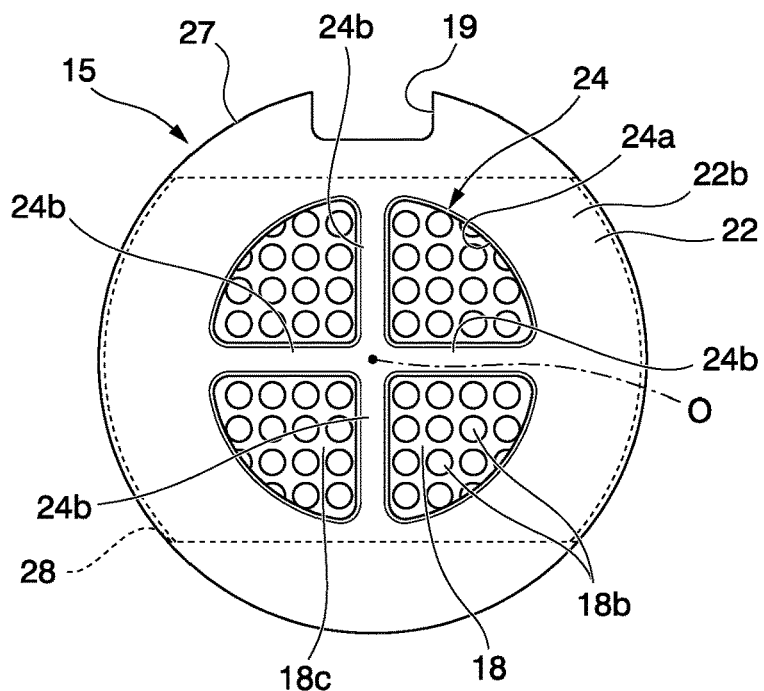
Figure 6:
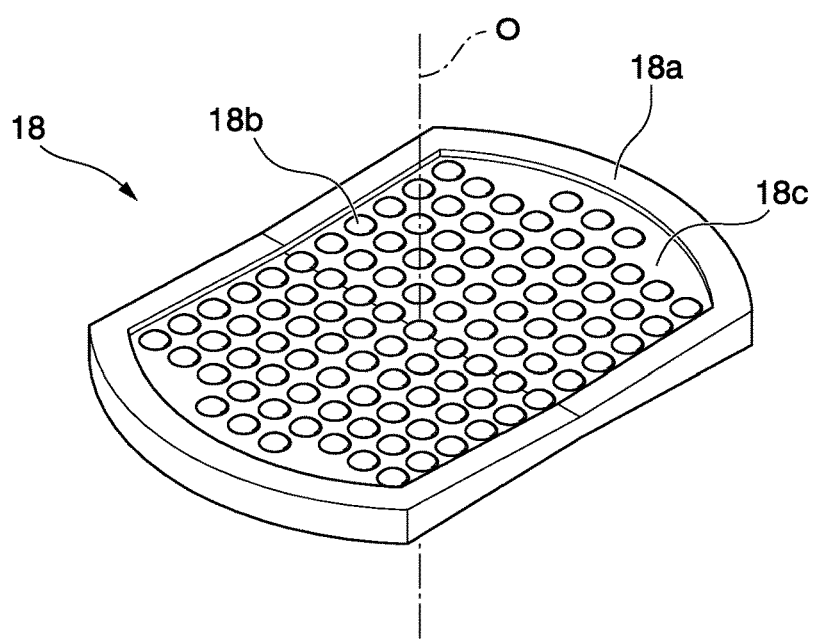
Figure 7:
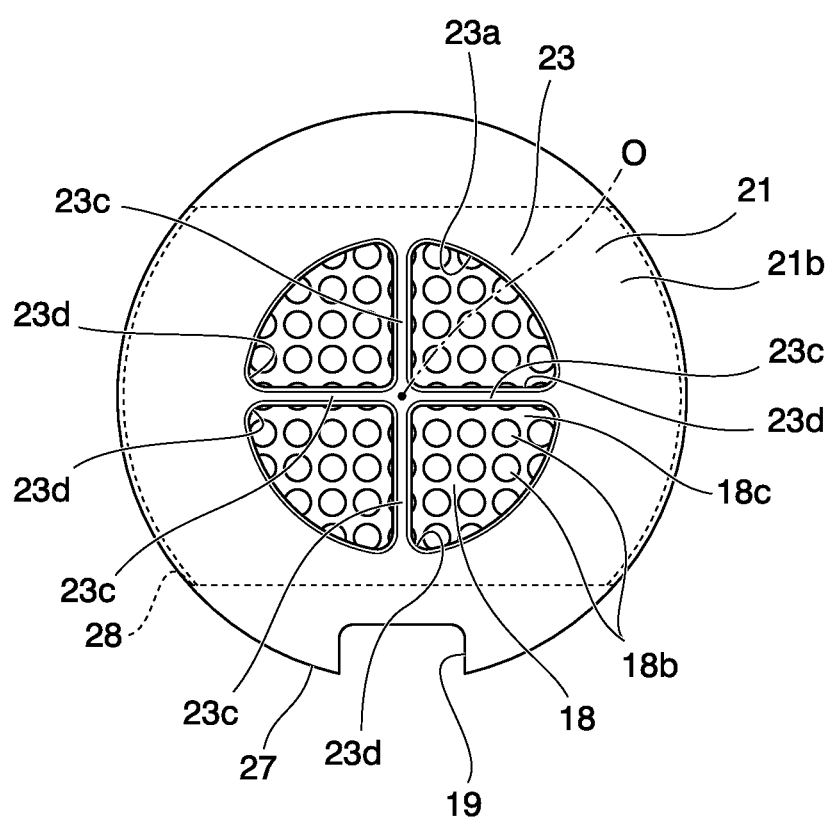

FIG. 1 is a front cross-sectional view of a vibration isolator;
FIG. 2 is a perspective view of a partition member;
FIG. 3 is a plan view of the partition member;
FIG. 4 is a cross-sectional view taken along line A-A of FIG. 3;
FIG. 5 is a rear view of the partition member;
FIG. 6 is a perspective view of a movable plate; and
FIG. 7 is a view which shows a first communication hole of another example.

DESCRIPTION OF EMBODIMENTS

Hereinafter, a vibration isolator of an embodiment of the present invention will be described with reference to the accompanying drawings.

FIG. 1 is a front cross-sectional view of a vibration isolator 10 according to this embodiment.

As shown in FIG. 1, the vibration isolator 10 includes a first tubular attachment member 11 connected to one of a vibration generating unit and a vibration receiving unit, a second attachment member 12 connected to the other thereof, and an elastic body 13 configured to elastically connect the first attachment member 11 and the second attachment member 12. The vibration isolator 10 includes a partition member 15 disposed inside the first attachment member 11 and configured to partition a liquid chamber 16 formed inside the first attachment member 11 into a main liquid chamber 16a and a subsidiary liquid chamber 16b.

In addition, these members are installed concentrically with respect to a central axis O. Hereinafter, a direction along the central axis O is an axial direction, a direction perpendicular to the central axis O is a radial direction, and a direction orbiting around the central axis O is a circumferential direction.

The above-mentioned liquid chamber 16 is partitioned into the main liquid chamber 16a using the elastic body 13 as a portion of a wall surface and disposed at one side in the axial direction (an upper side of FIG. 1) and the subsidiary liquid chamber 16b disposed at the other side in the axial direction (a lower side of FIG. 1) by the partition member 15.

In addition, for example, ethylene glycol, water, silicone oil, or the like, is sealed in the main liquid chamber 16a and the subsidiary liquid chamber 16b.

The vibration isolator 10 is mounted on, for example, a vehicle or the like, and the second attachment member 12 is connected to an engine (not shown) of the vibration generating unit. For example, the first attachment member 11 is connected to a vehicle body (not shown) of the vibration receiving unit via a bracket. Accordingly, transfer of vibrations of the engine to the vehicle body can be prevented.

The first attachment member 11 includes a first tubular section 11a formed at one side in the axial direction, a second tubular section 11b formed at the other side in the axial direction, and a stepped section 11c that connects the first tubular section 11a and the second tubular section 11b. The first tubular section 11a, the second tubular section 11b and the stepped section 11c are disposed on the same axis as the central axis O and integrally formed with each other. In addition, the second attachment member 12 is disposed closer to one side in the axial direction than the first tubular section 11a of the first attachment member 11. An end section of one side in the axial direction of the first attachment member 11 is closed by the elastic body 13 in a fluid-tight state. In addition, the end section of the other side in the axial direction of the first attachment member 11 is closed by a diaphragm 14 in a fluid-tight state. Accordingly, a liquid can be sealed in the inside of the first attachment member 11.

The elastic body 13 is a member formed of, for example, a rubber material or the like, and protrudes from the end section of the one side in the axial direction of the first attachment member 11 toward the second attachment member 12. The elastic body 13 includes a main body section 13a having a frustoconical shape, a diameter of which is gradually reduced toward the one side in the axial direction, and a coated section 13b extending from the main body section 13a toward the other side in the axial direction along an inner circumferential surface of the first attachment member 11. In addition, the main body section 13a and the coated section 13b are integrally formed with each other. The coated section 13b is adhered to the inner circumferential surface of the first attachment member 11 using vulcanized adhesion, and the inner circumferential surface of the first attachment member 11 is entirely coated with the elastic body 13.

(Partition Member)

FIG. 2 is a perspective view of the partition member 15 of this embodiment, FIG. 3 is a plan view (a top view) of the partition member 15 of this embodiment, FIG. 4 is a cross-sectional view taken along line A-A of FIG. 3, and FIG. 5 is a rear view of the partition member 15.

As shown in FIG. 2, the partition member 15 disposed inside the first attachment member 11 includes a first partition plate 21 and a second partition plate 22, which are disposed to oppose each other. The first partition plate 21 and the second partition plate 22 are members having a substantially circular plate shape, and integrally formed of, for example, an aluminum alloy. In addition, the partition member 15 may be formed of a resin.

As shown in FIG. 1, an outer surface 21b of the first partition plate 21 directed toward the one side in the axial direction faces the main liquid chamber 16a. The first partition plate 21 forms a portion of the partition wall of the main liquid chamber 16a.

In addition, an outer surface 22b directed toward the other side in the axial direction of the second partition plate 22 faces the subsidiary liquid chamber 16b side. The second partition plate 22 forms a portion of the partition wall of the subsidiary liquid chamber 16b.

As shown in FIG. 4, the first partition plate 21 and the second partition plate 22 are connected by a circumferential wall 27. An accommodating chamber 29 is formed between the first partition plate 21 and the second partition plate 22. The accommodating chamber 29 is formed by being surrounded by an inner surface 21a of the first partition plate 21 directed toward the other side in the axial direction, an inner surface 22a of the second partition plate 22 directed toward the one side in the axial direction, and the circumferential wall 27. A movable plate 18 (to be described later) is accommodated in the accommodating chamber 29.

In addition, as shown in FIG. 2, opening sections 28 in communication with the accommodating chamber 29 are formed at portions of the circumferential wall 27 opposite to each other in the radial direction. The movable plate 18 can be inserted into the accommodating chamber 29 through the opening section 28.

(First Communication Hole)

A first communication hole 23 passing through the first partition plate 21 in the axial direction is formed in the first partition plate 21. The accommodating chamber 29 and the main liquid chamber 16*a* are in communication with each other through the first communication hole 23 (see FIG. 1). As shown in FIG. 3, the first communication hole 23 is formed in a circular shape when seen from a plan view.

A plurality of ribs 23*b* (in the embodiment, four) are formed at an inner circumferential surface 23*a* of the first communication hole 23 to protrude inward in the radial direction. The ribs 23*b* are disposed in the circumferential direction at substantially equal intervals respectively. Extraction of the movable plate 18 from the accommodating chamber 29 toward the main liquid chamber 16*a* is prevented by the ribs 23*b*. In addition, a protrusion amount of the ribs 23*b* from the inner circumferential surface 23*a* of the first communication hole 23 inward in the radial direction is smaller than the radius of the inner circumferential surface 23*a* of the first communication hole 23. In a shown example, the protrusion amount is equal to about half of the radius of the inner circumferential surface 23*a* of the first communication hole 23.

(Second Communication Hole)

As shown in FIG. 4, a second communication hole 24 passing through the second partition plate 22 in the axial direction is formed in the second partition plate 22. The accommodating chamber 29 and the subsidiary liquid chamber 16*b* are in communication with each other by the second communication hole 24 (see FIG. 1). As shown in FIG. 5, the second communication hole 24 is formed in a circular shape when seen from a plan view.

A plurality of crosslinking sections 24*b* (in this embodiment, two crosslinking sections 24*b*) configured to connect opposite portions in the radial direction are formed to protrude from an inner circumferential surface 24*a* of the second communication hole 24. The crosslinking sections 24*b* are disposed about the central axis O at a position deviated by 90°. Further, the size in the circumferential direction of the crosslinking sections 24*b* (a width of the crosslinking sections 24*b*) is larger than the width of the rib 23*b*. The crosslinking sections 24*b* have a contact area with the movable plate 18 larger than that of the ribs 23*b*.

As shown in FIG. 2, an orifice path 19 is formed in the partition member 15 as a path in communication with the main liquid chamber 16*a* and the subsidiary liquid chamber 16*b*, separately from a path passing through the first communication hole 23, the second communication hole 24 and the accommodating chamber 29.

FIG. 6 is a perspective view of the movable plate 18.

As shown in FIG. 6, the movable plate 18 is formed of, for example, a rubber material or the like. The movable plate 18 is formed in a rectangular shape when seen from a plan view, and both end sections in a longitudinal direction are formed to expand and protrude outward in the longitudinal direction.

In the movable plate 18, an outer circumferential edge section 18*a* is thicker than an inner portion 18*c* disposed further inside than the outer circumferential edge section 18*a*. Accordingly, bending stiffness of the movable plate 18 is secured. Even when a variation in liquid pressure in the main liquid chamber 16*a* occurs and the movable plate 18 is displaced or deformed at the main liquid chamber 16*a* side through the first communication hole 23, extraction of the movable plate 18 from the first communication hole 23 toward the main liquid chamber 16*a* is prevented.

In addition, the outer circumferential edge section 18*a* of the movable plate 18 abuts the inner surface 21*a* of the first partition plate 21 and the inner surface 22*a* of the second partition plate 22.

A plurality of convex sections 18*b* having a spherical shape are formed in the inner portion 18*c* of the movable plate 18.

The movable plate 18 has a size that can cover the entire region of the first communication hole 23 and the second communication hole 24.

In the vibration isolator 10 having the above-mentioned configuration, when vibrations having minute amplitude are applied to the first attachment member 11 or the second attachment member 12, the movable plate 18 is displaced or deformed between the inner surface 21*a* of the first partition plate 21 and the inner surface 22*a* of the second partition plate 22. Accordingly, vibrations having minute amplitude of the first attachment member 11 or the second attachment member 12 can be absorbed and damped.

In addition, when vibrations (for example, engine shake vibrations) having an amplitude larger than the above-mentioned minute amplitude are applied to the first attachment member 11 or the second attachment member 12, a pressure of the liquid in the main liquid chamber 16*a* is varied. In this case, the movable plate 18 abuts the inner surface 21*a* of the first partition plate 21 or the inner surface 22*a* of the second partition plate 22, and then causes the fluid to flow between the main liquid chamber 16*a* and the subsidiary liquid chamber 16*b* through the orifice path 19. Accordingly, the vibrations having a large amplitude of the first attachment member 11 or the second attachment member 12 can be absorbed and damped.

According to this embodiment, an opening area of the first communication hole 23 near the main liquid chamber 16*a* is larger than that of the second communication hole 24 near the subsidiary liquid chamber 16*b*. For this reason, the movable plate 18 can be easily displaced or deformed more largely toward the main liquid chamber 16*a* than toward the subsidiary liquid chamber 16*b*.

Accordingly, when the elastic body 13 is deformed to largely expand the main liquid chamber 16*a* while maintaining displacement ability or deformation ability toward the subsidiary liquid chamber 16*b* of the movable plate 18, the movable plate 18 can be largely displaced or deformed toward the main liquid chamber 16*a*. Accordingly, a decrease in liquid pressure in the main liquid chamber 16*a* can be suppressed, and generation of cavitation can be suppressed. In addition, such an effect can be obtained, for example, even when a kind of liquid sealed in the liquid chamber 16 is changed or a valve is not installed. As a result, generation of strange noises due to cavitation collapse can be suppressed while maintaining manufacturing cost of the vibration isolator or desired vibration isolating properties.

In addition, the technical scope of the present invention is not limited to this embodiment but various modifications may be made without departing from the gist of the present invention.

That is, the specific material, configuration, or the like, described in this embodiment is merely an example and appropriate modifications may be made.

For example, in this embodiment, the case in which the second attachment member 12 and the engine are connected to each other and the first attachment member 11 and the vehicle body are connected to each other has been described. This is not limited to this embodiment. These may be configured such that the second attachment member 12 and the vehicle body are connected to each other and the first attachment member 11 and the engine are connected to each other, and the vibration isolator 10 may be installed at the other vibration generating unit or the other vibration receiving unit.

In addition, in this embodiment, while the movable plate 18 is formed of a rubber material, a resin material may be used.

In this embodiment, the orifice path 19 is formed in the circumferential wall 27 of the partition member 15 along a central axis of the partition member 15. This is not limited to this embodiment. An orifice path 19 extending in the circumferential direction in the circumferential wall 27, a path configured to bring the orifice path 19 in communication with the main liquid chamber 16a, and a path configured to bring the orifice path 19 in communication with the subsidiary liquid chamber 16b may be formed. That is, a course of the orifice path 19 can be lengthily secured.

In addition, while the orifice path 19 is formed in this embodiment, the orifice path 19 may not be formed.

In addition, while the orifice path 19 is formed in this embodiment, the orifice path 19 may not be formed.

In this embodiment, while the outer circumferential edge section 18a is thickly formed at the circumferential edge of the movable plate 18 throughout the entire circumference, for example, as a resin, a metal, or the like, is buried in the outer circumferential edge section 18a, stiffness of the movable plate 18 can be further improved.

In this embodiment, the movable plate 18 is formed in a substantially rectangular shape when seen from a plan view. The shape of the movable plate 18 is not limited to this embodiment. For example, the movable plate 18 may be formed in a substantially circular shape when seen from a plan view, or may be formed in substantially a D shape formed by cutting the circular shape when seen from a plan view.

FIG. 7 is a view showing a first communication hole 23 of another example.

In this embodiment, the first communication hole 23 is formed in a substantially circular shape when seen from a plan view. In addition, four ribs 23b are formed to protrude from the inner circumferential surface 23a of the first communication hole 23. However, the shape of the first communication hole 23 is not limited to this embodiment. As shown in FIG. 7, the opposite ribs 23b are connected to each other to form a wall section 23c, and the first communication hole 23 may be formed by four communication windows 23d formed in a circular shape. In this case, the thickness of the wall section 23c of the first communication hole 23 is thinner than that of the crosslinking sections 24b of the second communication hole 24. Accordingly, since the opening area of the first communication hole 23 is larger than that of the second communication hole 24, the same effect as that of this embodiment can be obtained.

In addition, in this embodiment, while the two crosslinking sections 24b connecting the opposite positions in the radial direction protrude from the second communication hole 24, the number of crosslinking sections 24b is not limited to two and may be, for example, three or four.

Further, in this embodiment, while the partition member 15 is constituted by the first partition plate 21 and the second partition plate 22, which are integrally formed with each other, the first partition plate 21 and the second partition plate 22 may be separately formed from each other.

INDUSTRIAL APPLICABILITY

According to the present invention, it is possible to provide the vibration isolator capable of suppressing generation of strange noises due to cavitation collapse while maintaining manufacturing cost of the vibration isolator or desired vibration isolating properties.

[Reference Signs List]

| | |
|---|---|
| 10: vibration isolator | 11: first attachment member |
| 12: second attachment member | 13: elastic body |
| 15: partition member | 16: liquid chamber |
| 16a: main liquid chamber | 16b: subsidiary liquid chamber |
| 18: movable plate | 23: first communication hole |
| 24: second communication hole | 29: accommodating chamber |

The invention claimed is:

1. A vibration isolator comprising:
a first tubular attachment member connected to one of a vibration generating unit and a vibration receiving unit and a second attachment member connected to the other unit;
an elastic body configured to elastically connect the first attachment member and the second attachment member;
a partition member disposed inside the first attachment member and configured to partition a liquid chamber formed inside the first attachment member into a main liquid chamber using the elastic body as a portion of a wall surface and disposed at one side in an axial direction and a subsidiary liquid chamber disposed at the other side in the axial direction; and
a movable plate displaced according to a pressure difference between the main liquid chamber and the subsidiary liquid chamber,
wherein an accommodating chamber, including a first partition plate on the main liquid chamber and a second partition plate on the subsidiary liquid side to support the movable plate, is configured to accommodate the movable plate and comprises a first communication hole configured to bring the accommodating chamber in communication with the main liquid chamber, and a second communication hole comprises a plurality of openings and is configured to bring the accommodating chamber in communication with the subsidiary liquid chamber are formed in the partition member,
an entire outer circumferential edge section of the movable plate is covered by the partition member when viewed from the main chamber and the subsidiary liquid chamber in the axial direction,
the main liquid chamber and the subsidiary liquid chamber are in communication with each other through the accommodating chamber, the first communication hole and the second communication hole,
a total opening area in the partition member of the first communication hole is larger than that in the partition member of the second communication hole,
the first communication hole and the second communication hole being configured such that the movable plate deforms greater toward the main liquid chamber side than toward the subsidiary liquid side,
a plurality of ribs are formed at an inner circumferential surface of the first communication hole to protrude inward in the radial direction, and
the first communication hole has only one opening and the second communication hole has a plurality of openings,
the total opening area of the first communication hole is larger than the opening area of each of the openings of the second communication hole, and a radius of the first communication hole is smaller than a radius of the second communication hole.

2. The vibration isolator according to claim 1, wherein the first communicating hole is disposed over a center of the movable plate and the plurality of openings of the second communicating hole are disposed away from the center of the movable plate.

3. The vibration isolator according to claim 1, wherein a center of the movable plate is not supported by the accommodating chamber on the main liquid chamber side and is supported in the center on the subsidiary liquid side.

4. The vibration isolator according to claim 1, wherein the movable plate comprises two straight side portions when viewed from the axial direction.

5. A vibration isolator comprising:
a first tubular attachment member connected to one of a vibration generating unit and a vibration receiving unit and a second attachment member connected to the other unit;
an elastic body configured to elastically connect the first attachment member and the second attachment member;
a partition member disposed inside the first attachment member and configured to partition a liquid chamber formed inside the first attachment member into a main liquid chamber using the elastic body as a portion of a wall surface and disposed at one side in an axial direction and a subsidiary liquid chamber disposed at the other side in the axial direction; and
a movable plate displaced according to a pressure difference between the main liquid chamber and the subsidiary liquid chamber,
wherein an accommodating chamber configured to accommodate and support the movable plate, the accommodating chamber including a first partition plate on the main liquid chamber and a second partition plate on the subsidiary liquid side to support the movable plate, the first partition plate having an opening having a plurality of support ribs extending from a perimeter thereof so as to be cantilevered from the perimeter and terminating at a distance from a center of the movable plate and a distance from the perimeter, the second partition plate having a plurality of openings defined by cross linking sections that support the center of the movable plate,
an entire outer circumferential edge section of the movable plate is covered by the partition member when viewed from the main chamber and the subsidiary liquid chamber in the axial direction,
the main liquid chamber and the subsidiary liquid chamber are in communication with each other through the accommodating chamber, the opening and the plurality of openings wherein a radius of the opening of the first partition plate is smaller than a radius of the plurality of openings in the second partition plate.

6. The vibration isolator according to claim 5, the opening and the plurality of openings are configured such that the movable plate deforms greater toward the main liquid chamber side than toward the subsidiary liquid side.

7. The vibration isolator according to claim 6, wherein the movable plate comprises two straight side portions when viewed from the axial direction.

8. The vibration isolator according to claim 1, wherein a protrusion amount of the ribs from the inner circumferential surface of the first communication hole inward in the radial direction is smaller than the radius of the inner circumferential surface of the first communication hole.

9. The vibration isolator according to claim 8, wherein the protrusion amount is equal to about half of the radius of the inner circumferential surface of the first communication hole.

10. The vibration isolator according to claim 1, wherein a plurality of crosslinking sections configured to connect opposite portions in the radial direction are formed to protrude from an inner circumferential surface of the second communication hole.

11. The vibration isolator according to claim 10, wherein the crosslinking sections are disposed about the central axis at a position deviated by 90°.

12. The vibration isolator according to claim 11, wherein the size in the circumferential direction of the crosslinking sections (a width of the crosslinking sections) is larger than the width of the rib.

13. The vibration isolator according to claim 12, wherein the crosslinking sections have a contact area with the movable plate larger than that of the ribs.

14. The vibration isolator according to claim 1, wherein an outer circumferential edge section of the moveable plate is thicker than an inner circumferential edge section that is disposed radially inward of the outer circumferential edge section.

15. The vibration isolator according to claim 5, wherein an outer circumferential edge section of the moveable plate is thicker than an inner circumferential edge section that is disposed radially inward of the outer circumferential edge section.

16. The vibration isolator according to claim 1,
wherein center sections of both the first partition plate and the second partition plate are formed to expand and protrude toward the movable plate.

* * * * *